(12) United States Patent

Bjordammen et al.

(10) Patent No.: US 9,124,905 B2
(45) Date of Patent: Sep. 1, 2015

(54) SYSTEM AND METHOD FOR OPTIMIZING STORAGE AND TRANSCODING COSTS IN NETWORK DVR

(71) Applicant: General Instrument Corporation, Horsham, PA (US)

(72) Inventors: David M Bjordammen, Blue Bell, PA (US); Thomas L Du Breuil, Ivyland, PA (US)

(73) Assignee: ARRIS Technology, Inc., Suwanee, GA (US)

( * ) Notice: Subject to any disclaimer, the term of this patent is extended or adjusted under 35 U.S.C. 154(b) by 214 days.

(21) Appl. No.: 13/857,499

(22) Filed: Apr. 5, 2013

(65) Prior Publication Data

US 2014/0282761 A1 Sep. 18, 2014

Related U.S. Application Data

(60) Provisional application No. 61/800,954, filed on Mar. 15, 2013.

(51) Int. Cl.
| | | |
|---|---|---|
| H04N 7/173 | (2011.01) | |
| H04N 21/231 | (2011.01) | |
| H04N 21/2747 | (2011.01) | |
| H04N 21/442 | (2011.01) | |
| H04N 21/472 | (2011.01) | |

(52) U.S. Cl.
CPC ......... *H04N 21/231* (2013.01); *H04N 21/2747* (2013.01); *H04N 21/44204* (2013.01); *H04N 21/47214* (2013.01)

(58) Field of Classification Search
CPC .......... H04N 21/231; H04N 21/47214; H04N 21/2747; H04N 21/44204
USPC .................................. 725/92, 58; 386/297
See application file for complete search history.

(56) References Cited

U.S. PATENT DOCUMENTS

| | | | |
|---|---|---|---|
| 7,877,468 B2 | 1/2011 | Abadir et al. | |
| 8,644,678 B2 * | 2/2014 | Smith et al. | 386/248 |
| 8,676,036 B1 * | 3/2014 | Bhogal et al. | 386/291 |

(Continued)

FOREIGN PATENT DOCUMENTS

| | | |
|---|---|---|
| EP | 1104195 A2 | 5/2001 |
| JP | 2009-188690 A | 8/2009 |

(Continued)

OTHER PUBLICATIONS

PCT Search Report, RE: Application #PCT/US2014/026883; dated Aug. 13, 2014.

(Continued)

*Primary Examiner* — Nasser Goodarzi
*Assistant Examiner* — Michael B Pierorazio
(74) *Attorney, Agent, or Firm* — Lori Anne D. Swanson

(57) ABSTRACT

A method includes: storing, via a network storage device, information related to the playback history of a content playing device; receiving, via a network digital video recorder scheduler, a request to record requested content; receiving, via a network digital video recorder, the requested content in a first format and the requested content in a second format; and storing, via the network digital video recorder, only one of the requested content in the first format or the requested content in a second format based on the information related to the playback history.

7 Claims, 6 Drawing Sheets

(56) References Cited

U.S. PATENT DOCUMENTS

| | | |
|---|---|---|
| 8,843,977 B2 * | 9/2014 | Ruffini et al. .................. 725/93 |
| 2004/0010492 A1 * | 1/2004 | Zhao et al. ........................ 707/3 |
| 2005/0080497 A1 | 4/2005 | Rao |
| 2006/0031889 A1 * | 2/2006 | Bennett et al. ................. 725/80 |
| 2006/0083434 A1 * | 4/2006 | Inata et al. ................... 382/232 |
| 2007/0061522 A1 | 3/2007 | Vink |
| 2007/0157260 A1 * | 7/2007 | Walker ........................... 725/86 |
| 2008/0115171 A1 * | 5/2008 | Barsness et al. .............. 725/58 |
| 2008/0235733 A1 * | 9/2008 | Heie et al. ...................... 725/46 |
| 2009/0172742 A1 * | 7/2009 | Weaver .......................... 725/58 |
| 2009/0254672 A1 | 10/2009 | Zhang |
| 2010/0231754 A1 * | 9/2010 | Wang et al. ............. 348/231.99 |
| 2010/0277606 A1 | 11/2010 | Deluca et al. |
| 2011/0038613 A1 | 2/2011 | Buchheit |
| 2011/0299448 A1 | 12/2011 | Meier et al. |
| 2012/0117103 A1 * | 5/2012 | Farrelly et al. ............... 707/769 |
| 2012/0117339 A1 * | 5/2012 | Kandekar et al. ............ 711/159 |
| 2012/0210382 A1 | 8/2012 | Walker et al. |
| 2012/0224834 A1 * | 9/2012 | Chen et al. ................... 386/293 |
| 2012/0265901 A1 | 10/2012 | Swenson et al. |
| 2013/0014187 A1 * | 1/2013 | Huang et al. .................. 725/93 |
| 2013/0129322 A1 * | 5/2013 | Bhogal et al. ................ 386/297 |
| 2013/0133009 A1 * | 5/2013 | Bhogal et al. .................. 725/58 |
| 2013/0174202 A1 * | 7/2013 | Kim et al. ...................... 725/61 |
| 2014/0013342 A1 * | 1/2014 | Swan et al. ....................... 725/5 |
| 2014/0067898 A1 * | 3/2014 | Steiner et al. ................. 709/201 |
| 2014/0282787 A1 | 9/2014 | Wirick et al. |

FOREIGN PATENT DOCUMENTS

| | | |
|---|---|---|
| WO | 2012/112910 A1 | 8/2012 |
| WO | 2013/014864 A1 | 1/2013 |

OTHER PUBLICATIONS

Wikipedia, description of Predictive Analytics, URL: <http://en.wikipedia.org/wiki/Predictive_analytics>, Jan. 17, 2013.

PCT Search Report & Written Opinion, RE: Application No. PCT/US2014/021640, dated Jul. 4, 2014.

J. Baumgartner, "Comcast Tests Network DVR in Boston", Light Reading, retrieved from the Internet at <http://www.lightreading.com/document.asp?doc_id=219785&site=lr_cable>, Apr. 13, 2012.

S. Dononhue, "Comcast Unveils Blueprint for Network DVR in Patent Application", Fierce Cable, retrieved from the Internat at <http://www.fiercecable.com/story/comcast-unveils-blueprint-network-dvr-patent-application/2012-08-29>, Aug. 29, 2012.

* cited by examiner

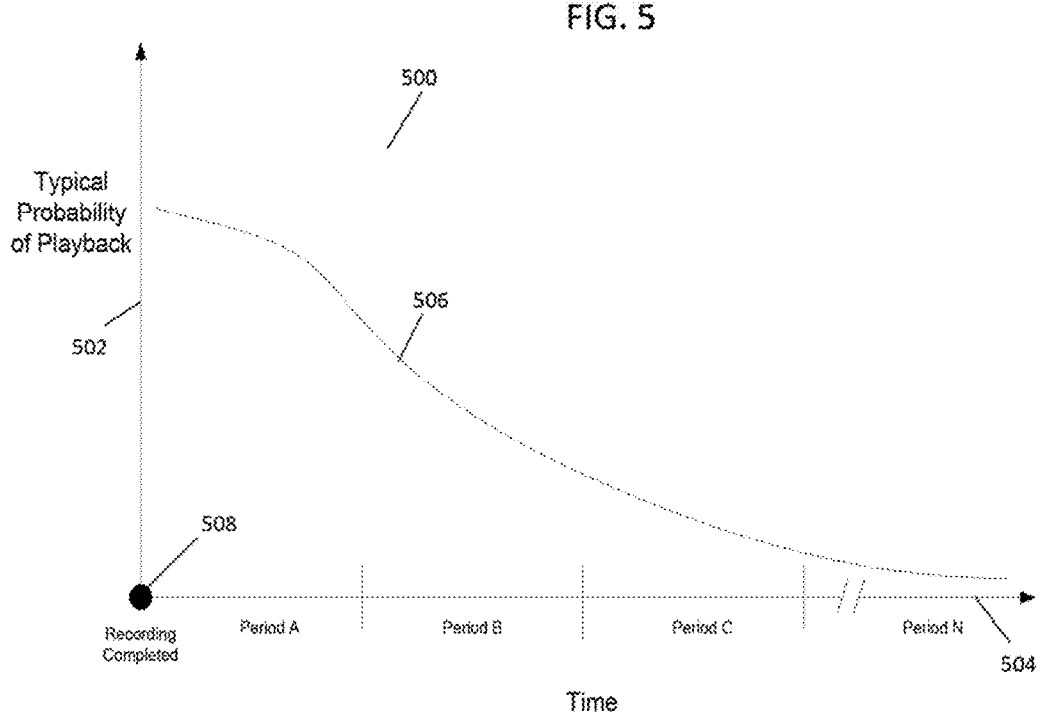

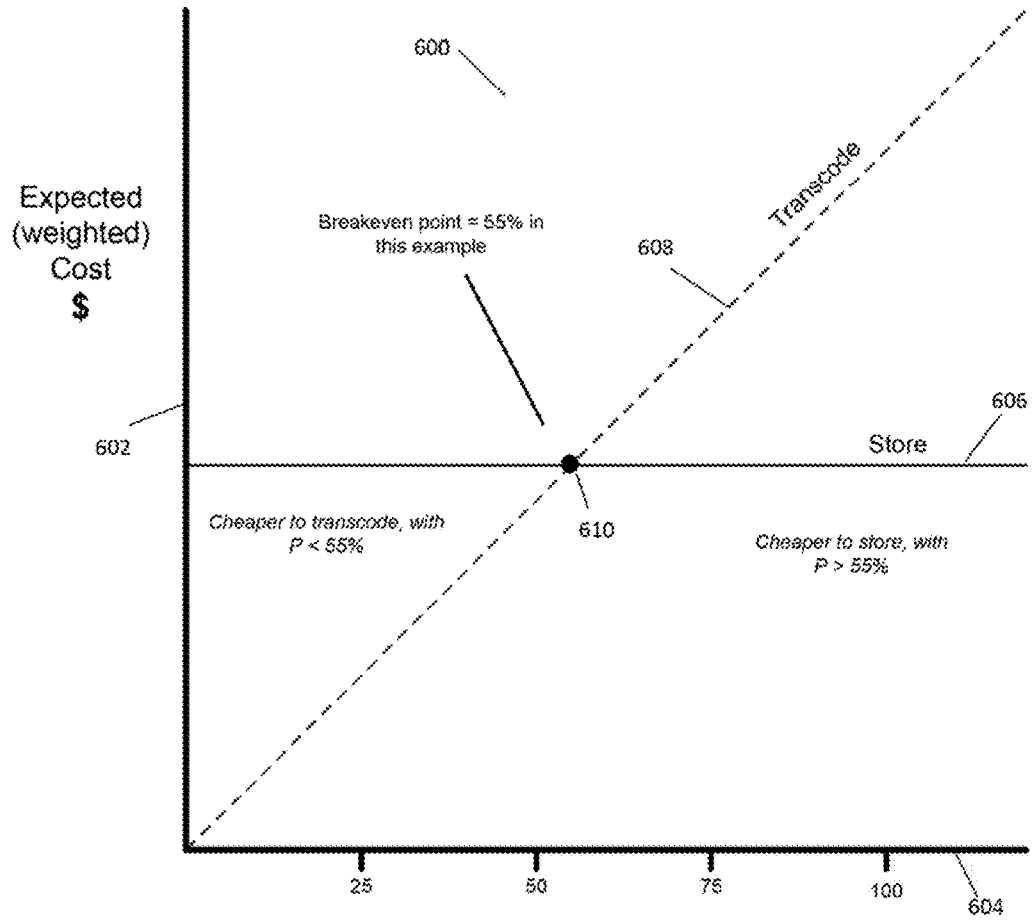

SYSTEM AND METHOD FOR OPTIMIZING STORAGE AND TRANSCODING COSTS IN NETWORK DVR

The present application claims priority from U.S. Provisional Application No. 61/800,954, filed Mar. 15, 2013, the entire disclosure of which is incorporated herein by reference.

BACKGROUND

The present disclosure generally deals with network digital video recorders (nDVRs).

BRIEF SUMMARY OF THE DRAWINGS

The accompanying drawings, which are incorporated in and form a part of the specification, illustrate example embodiments and, together with the description, serve to explain the principles of the present disclosure. In the drawings:

FIG. 5 illustrates a chart showing a cost analysis for the determination of whether to record or transcode content;
and
FIG. 6 illustrates a chart showing the probability of watching recorded content over time.

DETAILED DESCRIPTION

Figure 1:
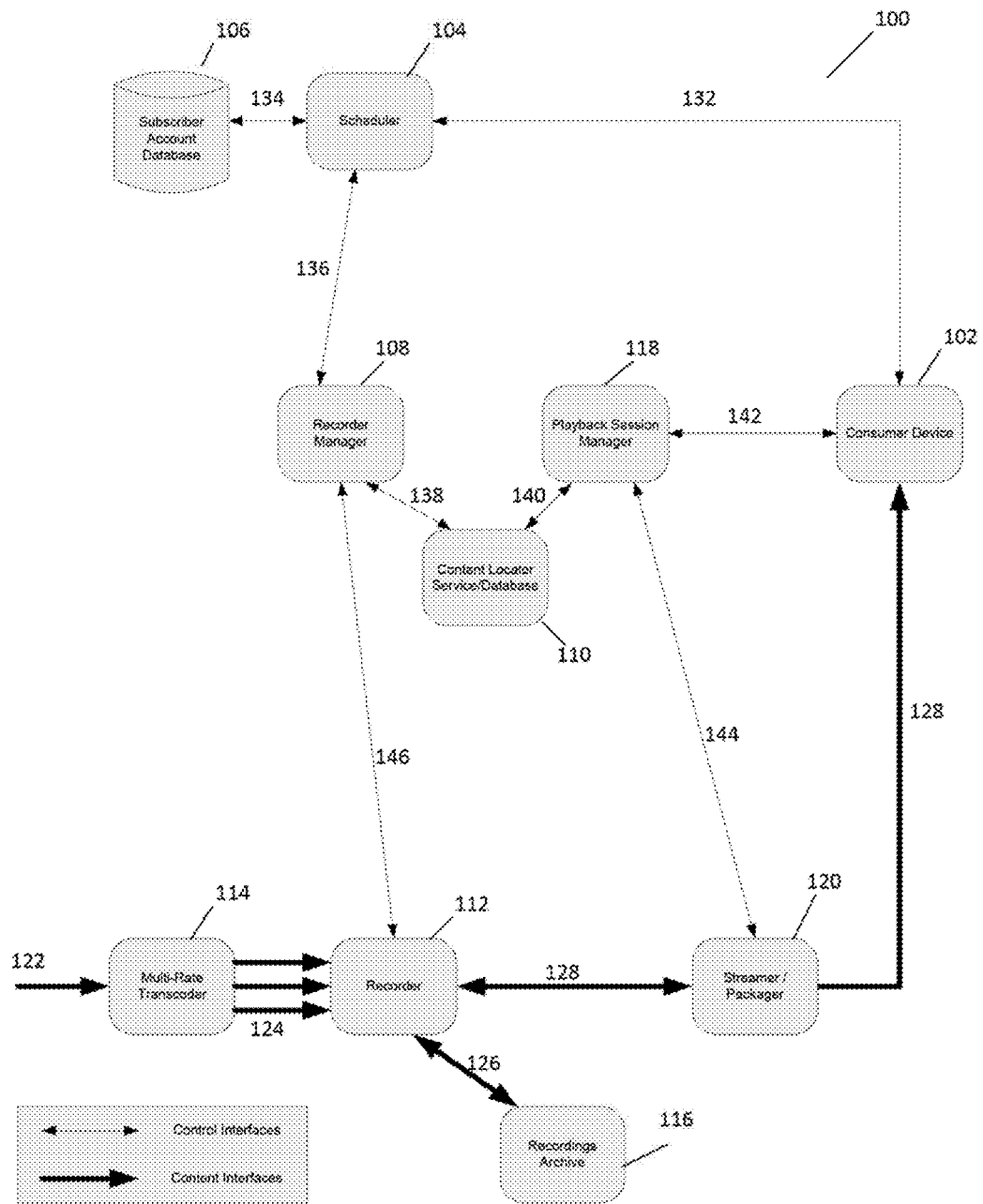
FIG. 1 illustrates a conventional nDVR system.

Embodiments of the present disclosure relate to a method for optimizing storage and transcoding costs in network based Video-On-Demand (nDVR) systems.

Many network operators are considering the deployment of a network-based DVR as an alternative to the traditional in-home DVR, e.g., a DVR that is included in a set-top-box (STB). Some of the reasons the nDVR approach is attractive to operators include: it is a more effective way to support DVR content on multiple screens, it allows legacy STBs to support DVR functions, it allows for lucrative upsale opportunities, and it enables a new platform for targeted advertising.

In some cases, the content provider is required to store each subscriber's recordings uniquely, even in the case where multiple subscribers record the same content. This requirement significantly drives up the storage costs in an nDVR deployment, to the point where those costs may exceed the costs of traditional in-home DVR. This factor is aggravated with support for multiple screens. As used herein, multiple screens means multiple formats. If all necessary formats are recorded and stored uniquely for each recording for each subscriber, the storage costs increase even more.

One way to decrease the storage costs of nDVR would be to minimize the number of formats recorded for a given asset (in the minimal case, to record only a single, high quality format). In order to support nDVR on multiple screens, however, the system would have to be able to dynamically transcode content on the fly, to convert the content into a format (i.e., screen resolution) appropriate for the display device. However, this on-demand transcoding is costly, consuming expensive processing resources on a transcoding device.

Thus there is a trade-off between storage costs and transcoding costs, and it is in the interest of network operators to find the optimal (lowest cost) balance between these costs.

One approach to the storage/transcode tradeoff is to statically configure the system in some mode, to handle all recordings in one of the following ways: record and store all possible formats, record and store only one format and transcode others as needed, or record and store a few specific formats and transcode to others as needed.

However, none of these static approaches are likely to be optimal. Because viewing habits vary by user, the best storage/transcode choice for one recording is not likely to be the best choice for another recording. In other words the one size fits all approach is certainly not optimal.

Some recordings are likely to be played back in only one format, other recordings perhaps only in another format, others may be played on all possible formats, and yet others may not be played back at all (studies show that 20% or more of all DVR recordings are never watched). Furthermore some recordings are likely to be played back within a day or two after the recording, but are then never watched again (consider, for example, a recording of a regular season baseball game). Other recordings are likely to be watched many times over a long period of time (consider the recording of a child's favorite movie). Note that these two types of recordings are likely to exist within the same subscriber account.

In general, there are multiple viewers in a household sharing the same account, and those viewers are all scheduling recordings. Furthermore, each viewer has different viewing habits, with different preferred viewing devices depending on the type of program. There exists a need to develop an process to predict which formats are the most likely to be watched, how often they will be watched and when they will be watched based on past viewing history.

FIG. 1 illustrates a conventional nDVR system 100.

As shown in the figure, system 100 comprises consumer device 102, scheduler 104, subscriber account database 106, recorder manager 108, content locator database 110, recorder 112, multi-rate transcoder 114, recordings archive 116, playback session manager 118, and streamer/packager 120.

Control interfaces are shown as thin connecting lines 132, 134, 136, 138, 140, 142, 144 and 146 and content interfaces are shown as thick connecting lines 122, 124, 126, 128 and 130. A control interface is an interface where instructions or commands are communicated, and a content interface is an interface where content is moved from one place to another.

Consumer device 102 can be any device on which content can be viewed and/or recordings scheduled (e.g., recordings may be scheduled via one consumer device on an account, and then played back on the same or different devices associated with that account). Non-limiting examples of consumer device 102 include a television, desktop computer, laptop computer, tablet computer and cellular phone. Consumer device 102 may also include a graphical user interface (GUI) that will provide the consumer to request content delivery, change settings, etc.

Scheduler 104 receives scheduling requests from consumer device 102, determines the accessibility of content and schedules content recordings.

Subscriber account database 106 stores account information of subscribers. Non-limiting examples of information stored include account number, customer name, address, subscription type, privileges, the types of devices used to view content, and specific device identities, e.g., devices may have to uniquely register to an account before they may be allowed to schedule or watch recordings for security reasons.

Recorder manager 108 receives information from scheduler 104 regarding the content to be recorded. Recorder manager 108 also relays information to recorder 112 regarding the type(s) of content and format(s) that need to be recorded for future viewing.

Content locator database 110 receives information from recorder manager 108 regarding the location of specific recorded content, information that is needed upon playback of the desired recorded content. Content locator database 110 may be in the form of a lookup table, spreadsheet, or other data storage format that would provide a mechanism by which to locate a specific content.

Recorder 112 records and stores the desired content. Recorder 112 records the content in digital format and saves it to a disk drive, USB flash drive, SD memory card or any other mass storage device designed to store large files like video content. Recorder 112 receives one or more transcoded content formats from multi-rate transcoder 114, based on the information regarding types and formats of content from recorder manager 108.

Multi-rate transcoder 114 serves to convert one type of encoded content to one or more other types of encoded content, such that the transcoded content may be viewed easily by different devices that require different video and/or audio formats (e.g., a high definition television versus a smart phone) and/or bitrates.

Recordings archive 116 is a storage device that can store older content that has not been viewed for some time. Further, in some situations, the cost associated with storing content in recordings archive 116 may be lower than the cost associated with storing content in recorder 112. Further, retrieving content from recordings archive 116 may take more time, from receipt of a content request, than retrieving content from recorder 112. Recordings archive 116 may include physical storage and/or memory media such as RAM, ROM, EEPROM, CD-ROM or other optical disk storage, magnetic disk storage or other magnetic storage devices that have the capacity to store content.

Playback session manager 118 communicates with consumer device 102 when it is time to watch a video that was previously recorded, and also with content locator database 110 to determine the location of the desired content. Playback session manager 118 knows which type of consumer device 102 is making the content request, and forwards that information along to streamer/packager 120.

Streamer/packager 120 is operable to provide content to consumer device 102 and to communicate with recorder 112 in order to assure that the content provided to consumer device 102 is provided in the appropriate format.

In operation, a consumer will determine that she wants to record a certain type of content. For this example, the content is a movie. The consumer will activate consumer device 102 and, using a user interface (not shown) on consumer device 102, inputs a request to record the movie. The request is sent, via control interface 132, to scheduler 104, which performs two functions. First, scheduler 104 checks, via control interface 134, the information contained in subscriber account database 106 to confirm that the consumer has the appropriate account and access privileges to record the desired movie. If the consumer does not have the appropriate account or access privileges, then the movie will not be recorded. If the consumer does have the appropriate account or access privileges, then scheduler 104 confirms that the movie will be recorded and sets up the recording.

The information generated by scheduler 104 is then sent, via control interface 136, to recorder manager 108. Recording manager 108 will record the content in whatever format was originally requested by consumer device 102. For example, if consumer device 102 requests the content in a standard definition format, recording manager 108 will record the content in a standard definition format. Similarly, if consumer device 102 requests the content in a high definition format, recording manager 108 will record the content in a high definition format. Recorder manager 108 knows via static configuration the 'location' on content to record, so no special lookup is required. Content locator database 110 finds where the recorded contents have been made/stored—this is because there may be actually many instances stored in recorder 112. So after the recording is configured on a specific instance of recorder 112, records manager 108 updates content locator database 110 with the location information for that particular recording. This location information in content locator database 110 is consulted upon playback, when the specific recording needs to be found.

Recorder 112 then records the appropriate content formats 124 of the movie provided by multi-rate transcoder 114, which had previously taken the highest quality content version 122 and transcoded it into content formats 124 most likely to be recorded by a consumer. It should be noted that there are typically many instances of recorder 112, which scale up as necessary to handle the ingest and recording of many assets, mostly as a function of the number of subscribers supported. After this is complete, the content is ready to be viewed by the consumer.

In order to watch the content, the consumer may request to view the movie using the user interface on consumer device 102. The request is sent to playback session manager 118, via control interface 142, and playback session manager 118 determines which instance of the recorder 112 contains the movie by communicating with content locator database 110 via control interface 140. Playback manager 118 then sends the viewing request to streamer/packager 120 via control interface 144. Streamer/packager 120 retrieves desired content format 128 from appropriate recorder 112 and streams desired content format 128 to consumer device 102 for the consumer to view.

System 100 is still limited in its approach to the storage/transcode tradeoff. As mentioned above, system 100 will be statically configured in some mode, to handle all recordings in one of the following ways: record and store all possible formats, record and store only one format and transcode others as needed, or record and store a few specific formats and transcode to others as needed.

Aspects in accordance with the present disclosure provide an alternative system and method managing storage/transcoding in a nDVR system. These will now be described with greater detail with reference to FIGS. 2-5.

Figure 2:
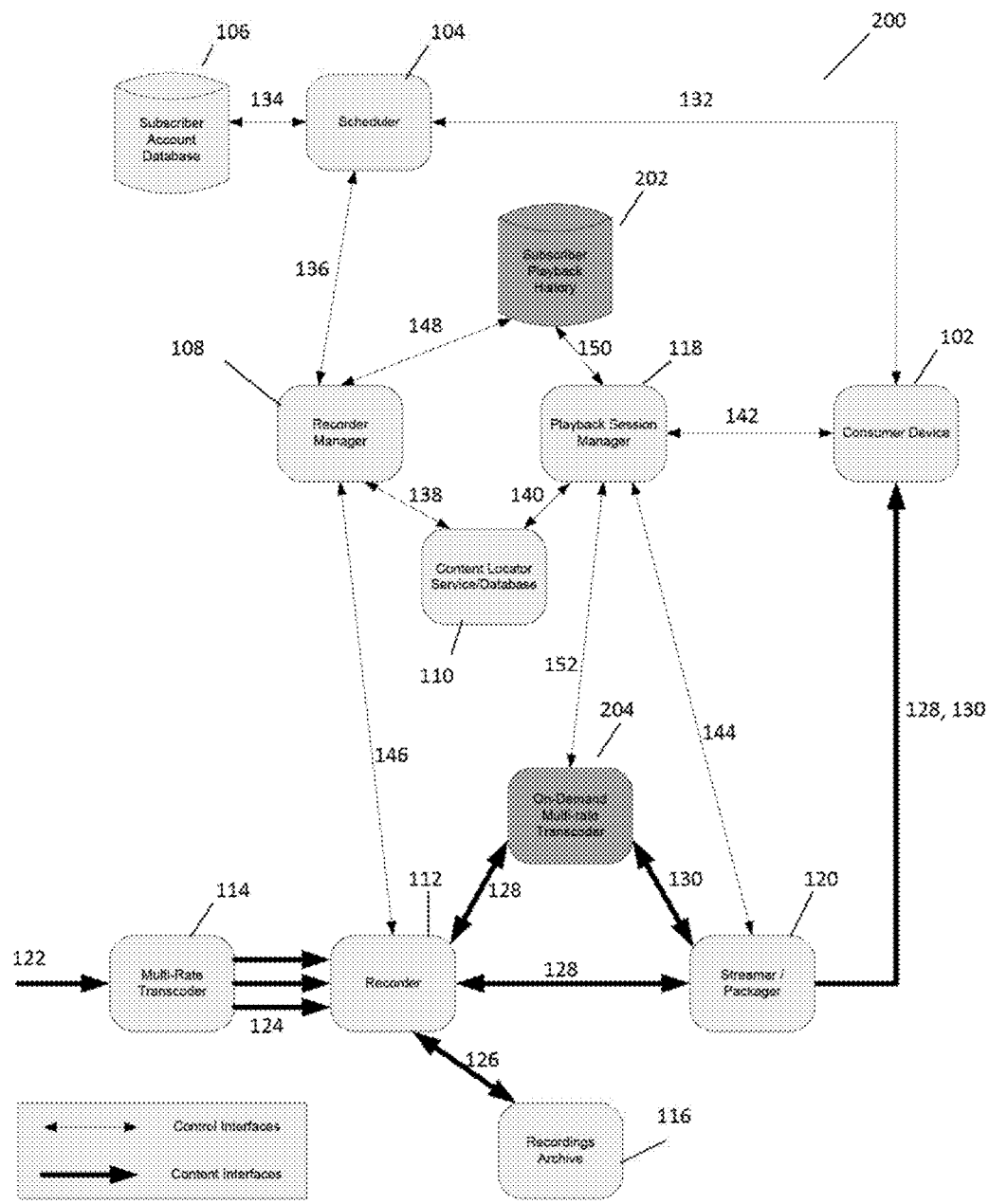
FIG. 2 illustrates another example nDVR system.

FIG. 2 illustrates another nDVR system.

As shown in the figure, nDVR system 200 includes all of the components of nDVR system 100 with the addition of subscriber playback history 202 and on-demand multi-rate transcoder (ODMRT) 204.

Subscriber playback history 202 is a database that stores information provided to it by playback session manager 118. Non-limiting examples of information stored on subscriber playback history 202 includes a record of playback operations for a consumer account. In some example, information may include the billing account number, playback device and capabilities, asset requested (including asset metadata such as Series Name, Genre, Episode/Title, Audience, Show Type, Parental Rating, etc.), time and date of session start, session type (i.e., VOD, nDVR, SDV), trick play usage and the type of delivery network (i.e., service provider managed, WiFi, 3G, etc.). In an example embodiment, information stored on subscriber playback history 202 includes a record of every playback operations for every consumer account. Note that the data recorded may not just be from nDVR sessions, but also VOD sessions as well as switched digital video (SDV) sessions.

Processed sessions may be captured in subscriber playback history 202 and marked accordingly. In some embodiments, all processed sessions may be captured in subscriber playback history 202 and marked accordingly. The reason VOD and SDV sessions may captured as well is to give the system a richer view into what types of content is watched, how often it is watched, and in which formats. This complete viewing history may be helpful in making predictions of future viewing of individual nDVR recordings.

ODMRT 204 is a transcoder that serves to convert one type of encoded content to one or more other types of encoded content at the point of playback, if the desired format is not stored on the recorder.

The operation of system 200 will be further described with reference to FIGS. 3-4.

Figure 3:
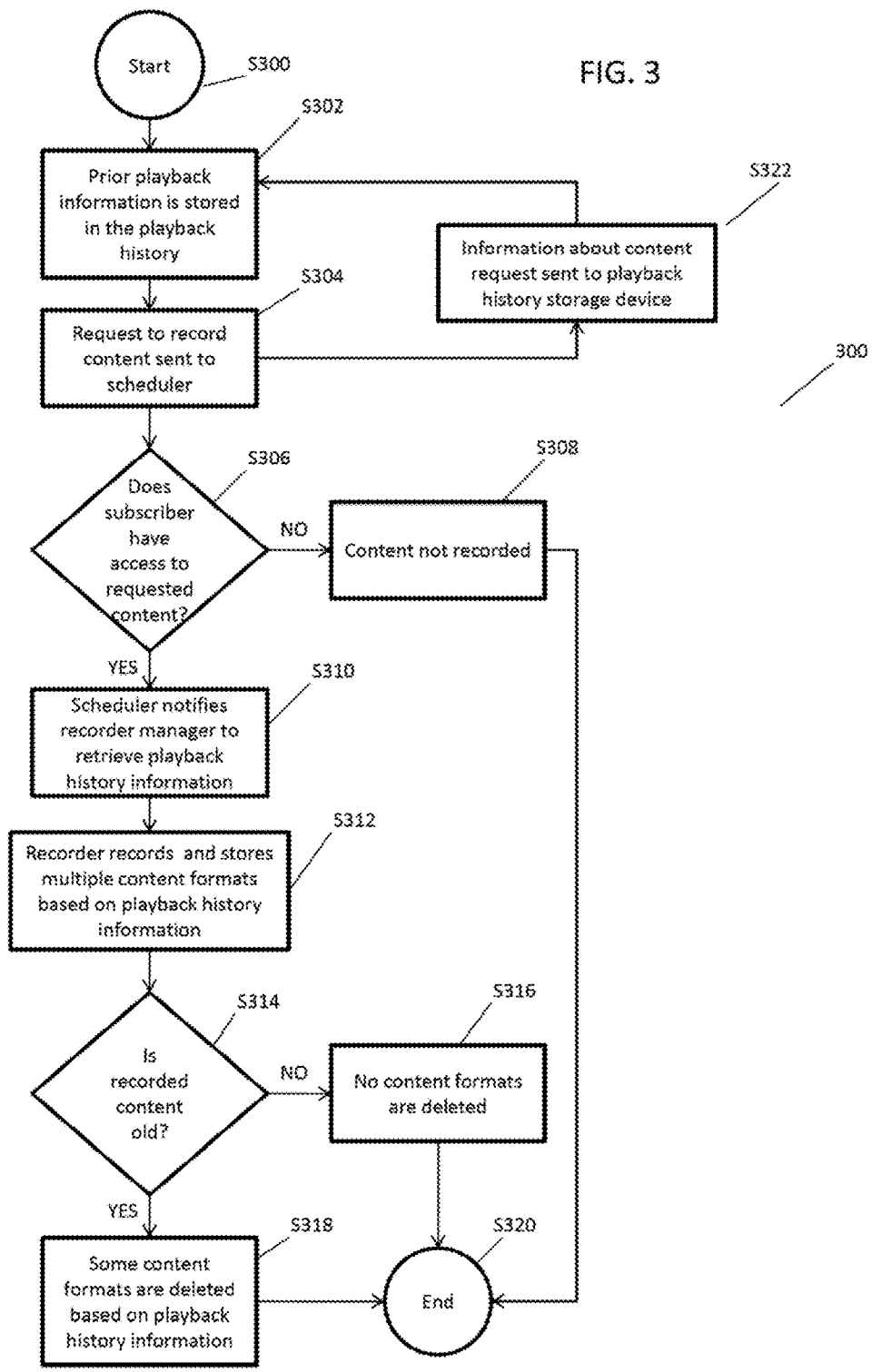
FIG. 3 illustrates a process by which content is stored and deleted.

FIG. 3 illustrates a method by which content is stored and deleted.

As shown in the figure, method 300 starts (S300) and any prior information regarding playback history is stored (S302) for future reference.

Returning to FIG. 2, the playback history information is stored within subscriber playback history 122.

Returning to FIG. 3, a request to record content is sent to a scheduler (S304). All information regarding the request (content type, type of device from which the request originates, etc.) is sent to a storage device (S322), where it is stored for future reference). In situations where the subscriber requesting the content does not have access to the content, then the information regarding the request will not be sent to the storage device. In particular, since the content will not be watched, such information is not relevant.

Returning to FIG. 2, consumer device 102 sends a request, via control interface 132, to record content to scheduler 104, and information relating to the request is sent to subscriber playback history 122, via control interface 148, for future reference.

Returning to FIG. 3, it may be determined if the subscriber requesting the content has access to the requested content (S306). If the subscriber does not have access to the requested content (NO at S306) then the content is not recorded (S308) and method 300 ends (S320). If the subscriber does have access to the requested content (YES at S306), then the schedule notifies the recorder manager to retrieve any available playback information (S310).

Returning to FIG. 2, scheduler 104 checks, via control interface 134, the information contained in subscriber account database 106 to confirm that the consumer has the appropriate account and access privileges to record the desired movie. If the consumer does not have the appropriate account or access privileges, then the movie will not be recorded. If the consumer does have the appropriate account or access privileges, then scheduler 104 confirms that the movie will be recorded and sets up the recording.

The information generated by scheduler 104 is then sent, via control interface 136, to recorder manager 108. Recorder manager 108 then communicates, via control interface 148, with subscriber playback history 202 to determine if the requested content, or something similar thereto, has been previously requested and/or viewed.

Returning to FIG. 3, the recorder then records and stores the requested content in different formats based on the information retrieved from the playback history information (S312).

Returning to FIG. 2, if the requested content, or something similar thereto, has not been previously requested or viewed, then recorder manager 108 may tell recorder 112, via control interface 146, to record standard format(s) based on the content being requested.

If the requested content, or something similar thereto, has been previously requested or viewed, then subscriber playback history 202 may determine which devices were used to view the similar content in past. That information would be forwarded to recorder manager 108, via control interface 148, which would then communicate with recorder 112, via control interface 146, such that recorder 112 would record the format(s) most likely to be viewed later by the consumer, thus saving storage and transcoding costs. A more detailed discussion of cost/benefit analysis of content storage versus transcoding will be described later with reference to FIG. 6.

Returning to FIG. 3, after a predetermined amount of time, the system will check the dates on which the requested content was recorded to determine if the content is old or whether it has been accessed one or more times (S314). For example, some content, like a television series, may be watched over the course of a week or two by several different family members, so it may not be desirable to use age as the only factor. If the requested content is not old (NO at S314) the no formats of the requested content are deleted (S316) and method 300 ends (S320). If the requested content is old and has not been accessed recently (YES at S316) then some content formats will be deleted based on the playback history information (S318) and method 300 ends (S320).

Returning to FIG. 2, after content 124 has been recorded, system 200 will periodically check to see if content 124 is considered "old". The user may provide a definition of "old" (for example, 5 days after recording), or system 200 may define "old" if a definition is not provided by the user. The definition of "old" may also change based on the type of content. For example, a user may only wish to keep a recorded baseball game as "new" for 2 days, but it may be desirable to keep a recorded movie as "new" for 2 months.

If content 124 is determined to be "old", then system 200 will consult subscriber playback history 202 to determine the content format that is most likely to be viewed by the user in the future. When the determination is made regarding the most likely format to be played in the future, all other formats of content 124 are deleted in order to save storage space on system 200. For example, if the requested content is a movie and the consumer typically watches movies on a tablet computer, then system 200 would delete all formats of content 124 except for the format that is best suited for viewing on a tablet computer. As another example, if the requested content is a baseball game and the consumer typically watches baseball games on an HD television, then system 200 would delete all formats of content 124 except for the HD format.

Figure 4:
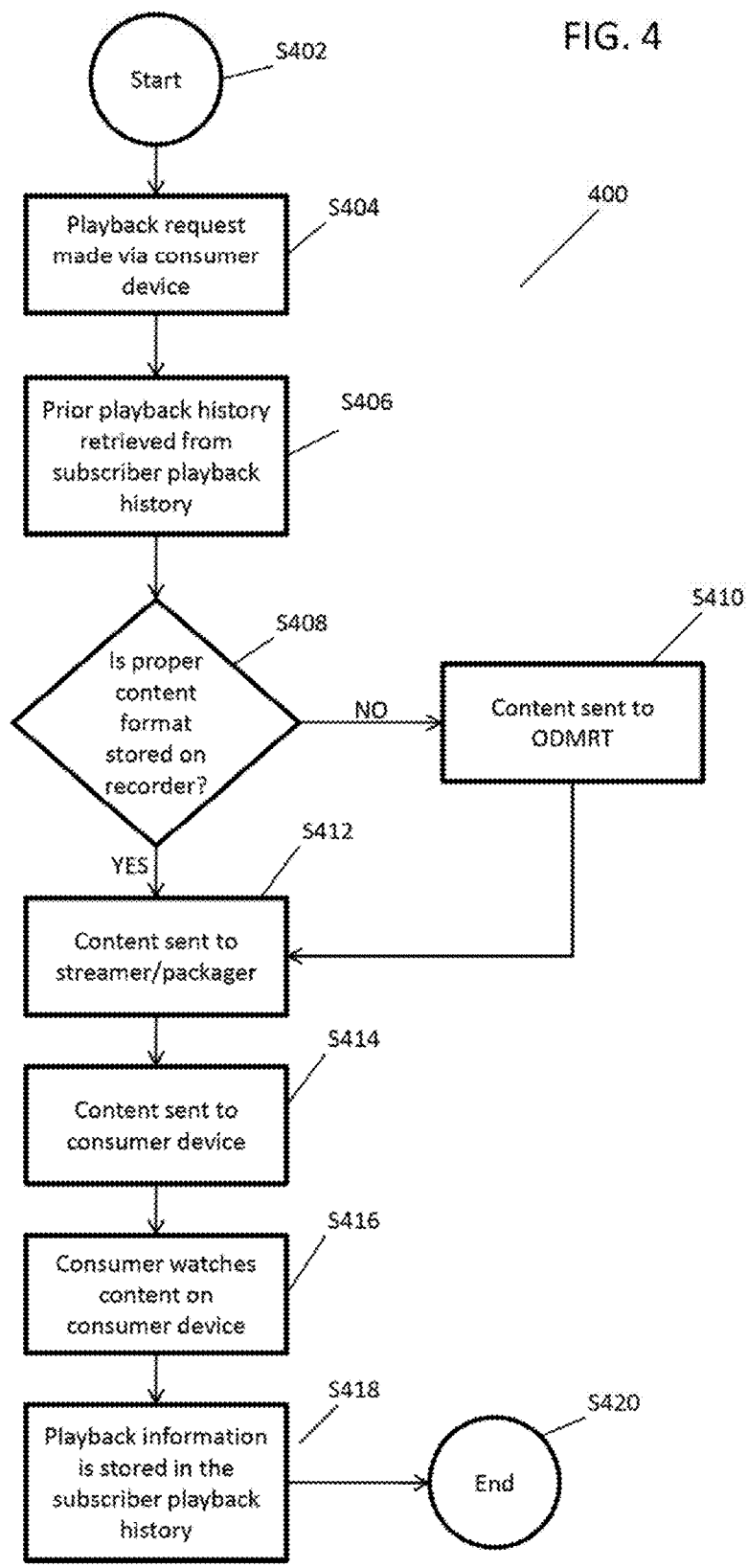
FIG. 4 illustrates a process by which content is played back.

FIG. 4 illustrates a method by which content is played back.

As shown in the figure, method 400 starts (S402) and a request is made to play back previously recorded content (S404).

Returning to FIG. 2, consumer device 102 sends the request to play back content 124 to playback session manager 118, via control interface 142, and playback session manager 118 sends all relevant information regarding the playback request to subscriber playback history 202, via control interface 150, and to ODMRT 204 via control interface 152. For purposes of discussion, let the request for content be originated from a tablet computer.

Returning to FIG. 4, all prior playback history is retrieved from the subscriber playback history (S406).

Returning to FIG. 2, subscriber playback history 118 will provide all relevant information regarding pasts requests (including the type of device requesting the content, and the playback format of the content) for the same (or similar) to playback session manager 118 via control interface 150.

Returning to FIG. 4, it may then be determined whether the proper content for playback is stored on the recorder (S408). If the proper content is stored on the recorder (YES at S408), then the content is sent to the streamer/packager (S412) for delivery to the consumer device (S412).

Returning to FIG. 2, If the similar content requested in the past was also requested by a tablet computer, then, based on the communication between subscriber history playback 202, recorder manager 108 and recorder 112 described above, the appropriate content format for a tablet computer may be available on recorder 112. In that case, content 128 is transferred from recorder 112 to streamer/packager 120 for delivery to consumer device 102, in this case a tablet computer.

Returning to FIG. 4, the consumer watches the content on the consumer device (S416), and all information regarding the current playback session is stored in the subscriber playback history (S418), and method 400 ends (S420).

Returning to FIG. 2, after streamer/packager 120 sends content 128 to consumer device 102, the consumer watches content 128. Information regarding the current playback session is also sent to subscriber playback history 202 via control interfaces 142 and 150, in order to provide more data for future content requests.

Referring to FIG. 4, if the proper content is not stored on the recorder (NO at S408), then the content may be sent to the ODMRT for transcoding (S410) prior to sending the content to the streamer packager (S412).

Returning to FIG. 2, now consider the alternative case where the similar content requested in the past was not requested by a tablet computer, but by a HD television. In this case, recorder 112 may not have a format stored that is compatible with a tablet computer, and therefore ODMRT 204 may need to transcode the content 128 when playback is requested. The transcoded content 130 may be transferred to streamer/packager 120 for delivery to consumer device 102, the tablet computer in this case.

Returning to FIG. 4, the remaining processes of method 400 (S412-S420) are executed as described above, and method 400 ends.

Over time, as subscriber playback history 202 records more and more information regarding playback history, the decisions made regarding which formats to store versus transcode may be more accurate.

In the above examples, system 200 may automatically determines what type of content to store and transcode.

The process for determining the format(s) of content to record versus transcode will be discussed in more detail with reference to FIG. 6, but it is appropriate to first address the relationship between the probability of watching recorded content as a function of the time elapsed since recording the content, which will be discussed in further detail with reference to FIG. 5.

FIG. 5 illustrates a chart 500 showing the probability of watching recorded content over time.

As shown in the figure, chart 500 includes probability axis 502, time axis 504, origin 508 and probability curve 506. Time axis 504 may be subdivided into smaller increments of time, shown as periods A-N on chart 500. In an example embodiment, periods A-N are 3-5 day increments, however embodiments be carried out using any other designated time increments.

In general, right after a recording is completed, i.e., from time t=0 at origin 508 to the end of period A, the probability of watching the recorded content is highest, and the overall probability of watching recorded content decreases over time, as shown generally by probability curve 506. For example, if a user records a baseball game but does not watch it within 2 days of recording it, it is very unlikely that the game will be watched, as other, more recent games may have been recorded for viewing. As another example, if a user records the evening news but does not watch it the next day, the likelihood of it being watched is very low, as the news will no longer be current, and evening news program will be broadcast the next evening. As yet another example, if a user records an episode of a popular sitcom and it is not watched by the time the episode is aired the next week, the likelihood of the recorded episode being watched is very low.

It should be noted that probability curve 506 depicts a typical, expected probability of playback for a particular content, and no assumptions are made based on the general probability curve 506. Instead, the probability curve for each piece of content is calculated based on the viewing history for the subscriber account, as described by the examples provided above.

FIG. 6 illustrates a chart showing a cost analysis for the determination of whether to record or transcode content.

As shown in the figure, chart 600 includes expected (weighted) cost axis 602, playback probability axis 604, storage cost line 606, transcode cost line 608 and breakeven point 610.

In general, the cost to store a piece of content remains constant regardless of the probability of playback, noted by the flat storage cost line 606. In general, the cost to transcode a piece of content is higher than it is to store that same piece of content. Therefore, as the probability of playback increases, it is much more cost effective to have the content stored instead of transcoding it. This is shown generally by the upward sloped transcode cost line 608. The point at which storage cost line 606 and transcode cost line 608 intersect is breakeven point 610. At breakeven point 610, the cost to transcode and the cost to store are equal. In the example shown in chart 600, the breakeven point occurs when the probability of playback is 55%. As discussed above, this means that when the probability of viewing the content is less than 55%, the desired content format should not be stored in recorder 112, but transcoded when the playback request is received. Conversely, when the probability of viewing the content is greater than 55%, the desired content format should be stored in recorder 112 in order to reduce costs. When the probability of viewing the content is exactly 55%, then the content may either be stored in the desired format or not stored, as the cost for either option is the same.

The breakeven point may be different for different types of content, so each piece of content may have a unique expected cost vs. playback probability chart. The following example details a scenario in which decisions are made to transcode and/or record content.

In a first example, consider a subscriber account having the following devices: a HD device that is compatible with H.264, known as the mezzanine format; a standard definition device that is compatible with MPEG-2, known as format X; a tablet device that may use an adaptive bit rate and is compatible with H.264, 720×480 resolution, 2000 Kbps, known as format Y; and a smartphone that may use an adaptive bit rate and is compatible with H.264, 360×240 resolution, 440 Kbps, known as format Z.

In this example, the mezzanine format (H.264) is the highest quality format. For purposes of discussion, let this format always be recorded be used to transcode all other formats as necessary. Further, let there are three different time periods: Period A (0-2 days after recording); Period B (2-6 days after recording); and Period C (6-10 days after recording).

The following table outlines some assumed costs:

|  | Format X | Format Y | Format Z |
|---|---|---|---|
| Cost to record 1 hour and store for period A | $Store_{X-A}$ = $1.00 | $Store_{Y-A}$ = $0.80 | $Store_{Z-A}$ = $0.50 |
| Cost to transcode 1 hour | $Trans_X$ = $2.00 | $Trans_Y$ = $2.50 | $Trans_Z$ = $3.00 |
| Cost to store 1 hour for period B | $Store_{X-B}$ = $1.20 | $Store_{Y-B}$ = $1.00 | $Store_{Z-B}$ = $0.70 |
| Cost to store 1 hour for period C | $Store_{X-C}$ = $1.20 | $Store_{Y-C}$ = $1.00 | $Store_{Z-C}$ = $0.70 |

The main initial job of the recorder manager may be to decide which formats to record. To determine this, the recorder manager may only be concerned with the probability of playback during the first time period (Period A). The probability of playback during later time periods may be used to determine if and when already stored formats are deleted.

In this example, let the following playback percentages for period A be as follows: Percentage of all recordings played back in format X within period A: $P_{All-X-A}$=50%; Percentage of similar recordings played back in format X within period A: $P_{Sim-X-A}$=10%; Percentage of all recordings played back in format Y within period A: $P_{All-Y-A}$=15%; Percentage of similar recordings played back in format Y within period A: $P_{Sim-Y-A}$=55%; Percentage of all recordings played back in format Z within period A: $P_{All-Z-A}$=10%; Percentage of similar recordings played back in format Z within period A: $P_{Sim-Z-A}$=15%; and Similarity weighting factor (% confidence factor—how closely does the recording in question match the similar recordings from account history): Sim-Factor=90%.

Based on the data above, it is clear that there are many similar playback operations on this account (the Sim-Factor is a high 90%). The history indicates that similar recordings are played back frequently on the Tablet (Format Y), but not so frequently on the standard definition device (Format X) nor on the smartphone (Format Z).

To determine the relative cost of storing versus transcoding for format X (MPEG-2), the following comparison is made: relative cost to record and store:

$Store_{X-A}$=$1.00;

Relative weighted cost to transcode: (Sim-Factor*$P_{Sim-X-A}$+[1-Sim-Factor]*$P_{All-X-A}$)
*$Trans_X$=(0.90*$0.10)+($0.10*$0.50)
*$2.00=$0.28.

The weighted cost to transcode to Format X is less than the cost to store. The reason this is that case is that similar programs are rarely played back in this format. So it does not make sense to record this format up front, instead to transcode to this format only if requested (which is unlikely).

To determine the relative cost of storing versus transcoding for format Y (ABR for tablet), the following comparison is made: relative cost to record and store:

$Store_{Y-A}$=$0.80;

Relative weighted cost to transcode: (Sim-Factor*$P_{Sim-Y-A}$+[1-Sim-Factor]*$P_{All-Y-A}$)
*$Trans_Y$=(0.90*$0.55)+($0.10*$0.15)
*$2.50=$1.27.

The weighted cost to transcode to Format Y is more than the cost to record and store. The reason this is that case is that similar programs are frequently played back on the tablet. Thus a playback request for tablet is likely for this program too, and it is thus cheaper to record and store this format up front (thereby avoiding a likely and costly transcoding operation in the future).

To determine the relative cost of storing versus transcoding for format Z (ABR for smartphone), the following comparison is made: relative cost to record and store:

$Store_{Z-A}$=$0.50;

Relative weighted cost to transcode: (Sim-Factor*$P_{Sim-Z-A}$+[1-Sim-Factor]*$P_{All-Z-A}$)
*$Trans_Z$=(0.90*$0.15)+($0.10*$0.10)
*$3.00=$0.44.

The weighted cost to transcode to Format Z is less than the cost to store. The reason this is that case is that similar programs are rarely played back in this format (for Smart Phone). So it does not make sense to record this format up front, instead to transcode to this format only if requested, which is unlikely to happen.

Within this example, it may also necessary to determine if and when to delete a given format once the content has been stored past time period A. Based on the above calculations, the recorder manager decides to record two formats for this asset: the mezzanine format (H.264 High Def) and format Y (ABR for the tablet). With respect to this recording the recorder manager may periodically check the viewing history of similar assets on this account to determine how long it makes sense to store format Y. There is an ongoing cost to store this media file, but the value of holding that file decreases over time as the likelihood the user may request playback decreases.

Formats X and Z are irrelevant at this point since they were not recorded and stored, thus there is no consideration to whether or not those formats should be deleted.

The relevant data for the decision for format Y in period B may determined from viewing history on the account. For purposes of discussion, in this example, let the relevant data be as follows:

Percentage of all recordings played back in format Y in period B: $P_{All-Y-B}$=10%;
Percentage of similar recordings played back in format Y in period B: $P_{Sim-Y-B}$=5%;
Similarity weighting factor (% confidence factor—how closely does the recording in question match the similar recordings from account history): Sim-Factor=90%.

For purposes of discussion, in this example, to determine the relative cost of storing versus transcoding for format Y in period B, the following comparison is made: relative cost to record and store:

$Store_{Y-B}$: $1.00;

Relative weighted cost to transcode: (Sim-Factor*$P_{Sim-Y-B}$+[1-Sim-Factor]*$P_{All-Y-B}$)
*$Trans_Y$=(0.90*$0.05)+($0.10*$0.10)
*$2.50=$0.14.

Since the relative weighted cost to transcode ($0.14) is less than the relative cost to store ($1.00), then format Y should be deleted at the start of Period B (i.e., at the end of Period A).

Naturally, since the event is deleted in period B, there is no need to check the data for period C. The recorder manager would not attempt to determine the period C data in this example, since that would be unnecessary work, e.g., the period C data is not relevant.

In the above example, the mezzanine format stored was the format of the highest quality. However, there may be instances where the mezzanine format may not need to be the highest quality. For example, if historical usage of viewing patterns shows that content is only viewed on a limited resolution device, then the mezzanine format may only need to be a lower resolution format, like SD instead of HD, which would result in significant cost savings.

In current nDVR systems, in order to assure the appropriate content format will be available, it is necessary to store many different content formats (for the same piece of content) for potential future playback. Storing many different content formats can become very expensive, especially if the consumer typically watches content in only a select number of formats based on the devices used.

The present disclosure provides methods to reduce costs associated with content storage on nDVR systems by storing data related to past content recording and viewing preferences, and using that data to predict which content formats are most likely to be viewed on a particular device. Using this information, it is possible to store only a limited number of content formats, thus reducing costs associated with content storage. In addition, if a content format is requested that is atypical for the user, an on-demand multi-rate transcoder can by employed to transcode the content to the appropriate format at the time of playback.

Another aspect of the present disclosure provides methods to further reduce costs associated with content storage by analyzing older content that is stored on the system, and deleting all forms of the content available except for the one(s) most likely to be viewed by the user in the future.

The foregoing description of various preferred embodiments have been presented for purposes of illustration and description. It is not intended to be exhaustive or to limit the disclosure to the precise forms disclosed, and obviously many modifications and variations are possible in light of the above teaching. The example embodiments, as described above, were chosen and described in order to best explain the principles of the disclosure and its practical application to thereby enable others skilled in the art to best utilize the disclosure in various embodiments and with various modifications as are suited to the particular use contemplated. It is intended that the scope of the disclosure be defined by the claims appended hereto.

What is claimed as new and desired to be protected by Letters Patent of the United States is:

1. A method comprising:
   for each of a plurality of subscriber accounts, storing, via a network storage device, information related to a playback history of at least one content playing device associated with the respective subscriber account;
   receiving, via a network digital video recorder scheduler, requests to record content from subscribers;
   for each of the plurality of subscriber accounts associated with a request to record content, determining whether to record or retain the requested content for the respective subscriber account over a plurality of configurable time slots in accordance with the following:
   during a first time slot:
   identify one or more formats of the requested content to evaluate based on the playback history associated with the respective subscriber account;
   determine a probability that the requested content in the identified one or more formats will be played for the respective subscriber account during the first time slot;
   determine a cost to transcode the requested content for each of the determined one or more formats, where the cost to transcode is weighted based on the probability that an asset in the identified one or more formats will be played for the respective subscriber account in the first time slot;
   determine a cost to record and store each of the identified one or more formats of the requested content;
   for each format, compare the weighted transcoding cost to the cost to record and store the format;
   record the requested content in the one or more evaluated formats if the weighted cost to transcode the requested content is greater than a cost to record and store the format; and
   in one or more subsequent time slots, calculate a weighted transcoding cost for recorded formats and determine whether to delete any assets from storage for a respective subscriber during the respective one or more subsequent time slots.

2. The method of claim 1, wherein the playback history includes information related to at least one of content playing device capabilities, previous content requested, time and date of session start, or trick play usage.

3. The method of claim 1, wherein at least one recorded format is the highest quality format.

4. The method of claim 1, further comprising storing the requested content in both a first format and a second format during the first time slot, and subsequently deleting the content in one of the first format or the second format in the one or more subsequent time slots after a predetermined period of time.

5. The method of claim 1, further comprising:
   receiving, via a network digital video recorder, the requested content in a plurality of formats; and
   storing, via the network digital video recorder, the requested content in less than all of the received plurality of formats.

6. The method of claim 1, further comprising transcoding a format of the requested content retained in storage into a required format for a content playing device associated with a subscriber, wherein the required format was at least one of not recorded in storage in the first time slot or deleted in the one or more subsequent time slots.

7. The method of claim 1, wherein determining whether to record requested content in one or more formats is made individually for each subscriber account such that determining whether to record requested content in a particular format for a first subscriber account is a separate determination from whether to record requested content in a particular format for a second subscriber account.

* * * * *